(12) United States Patent
Caceres et al.

(10) Patent No.: US 8,354,048 B2
(45) Date of Patent: Jan. 15, 2013

(54) FIBERGLASS LAWN EDGING

(76) Inventors: Peter Caceres, Keller, TX (US); John Fakhari, Keller, TX (US)

( * ) Notice: Subject to any disclaimer, the term of this patent is extended or adjusted under 35 U.S.C. 154(b) by 195 days.

(21) Appl. No.: 12/424,709

(22) Filed: Apr. 16, 2009

(65) Prior Publication Data

US 2009/0236768 A1  Sep. 24, 2009

Related U.S. Application Data

(63) Continuation of application No. 10/234,991, filed on Sep. 4, 2002, now abandoned.

(60) Provisional application No. 60/329,793, filed on Oct. 16, 2001.

(51) Int. Cl.
*B29C 47/06* (2006.01)

(52) U.S. Cl. ........................................ 264/148; 264/137

(58) Field of Classification Search ................... 264/145, 264/148, 134–137
See application file for complete search history.

(56) References Cited

U.S. PATENT DOCUMENTS

| | | | |
|---|---|---|---|
| 1,977,021 A | 10/1934 | Spencer | |
| 3,041,781 A * | 7/1962 | Richter | 47/33 |
| 3,495,352 A | 2/1970 | Sbare | |
| 3,500,036 A | 3/1970 | Szentveri | |
| 3,782,663 A | 1/1974 | Stevenson | |
| 3,801,072 A | 4/1974 | Newberry, Jr. | |
| 3,916,563 A | 11/1975 | Tedesh | |
| 3,951,294 A | 4/1976 | Wilson | |
| 4,092,081 A | 5/1978 | Schmanski | |
| 4,514,790 A | 4/1985 | Will | |
| 4,567,079 A | 1/1986 | Canfield et al. | |
| 4,794,726 A | 1/1989 | Fawcett et al. | |
| 4,945,675 A | 8/1990 | Kendrick | |
| 4,956,199 A | 9/1990 | Ruisi | |
| 5,066,353 A | 11/1991 | Bourdo | |
| 5,117,583 A | 6/1992 | Reum | |
| 5,217,771 A | 6/1993 | Schmanski et al. | |
| 5,259,154 A | 11/1993 | Lilley | |
| 5,310,355 A | 5/1994 | Dannatt | |
| 5,317,833 A | 6/1994 | Goldman | |

(Continued)

FOREIGN PATENT DOCUMENTS

EP  1586233 A1  10/2005

(Continued)

OTHER PUBLICATIONS

Lifestyles Publications—Archives, Aug. 21, 2001, How Does Your Garden Grow? A Work of Art, [retrieved from internet Apr. 23, 2007] 10 pages. http://209.85.165.104/search?q=cache:YIICQlbh84EJ:www.sasklifestyles.com/archive/Aug21-01.htm+%22fiberglass+lawn+edging%22&hl=en&ct=clnk&cd=6&gl=us.

(Continued)

*Primary Examiner* — Christina Johnson
*Assistant Examiner* — Xue Liu
(74) *Attorney, Agent, or Firm* — Erickson, Kernell, Derusseau & Kleypas, LLC

(57) ABSTRACT

A system of fiberglass lawn edging materials. The pultruded fiberglass system provides a lawn edging that is durable and easy to install. The fiberglass edging material comes in a long, flat shape that can be rolled up for ease of display and transport. The system includes metal or pultruded fiberglass stakes. The system includes a integral veil that allows for a variety of surface treatments.

11 Claims, 6 Drawing Sheets

U.S. PATENT DOCUMENTS

| | | | |
|---|---|---|---|
| D353,206 S | 12/1994 | Dunbar | |
| 5,410,458 A | 4/1995 | Bell | |
| 5,452,553 A | 9/1995 | Clapp et al. | |
| 5,519,970 A * | 5/1996 | Reum et al. | 52/102 |
| 5,585,455 A * | 12/1996 | Pratt et al. | 442/391 |
| 5,611,186 A | 3/1997 | Weaver | |
| 5,675,930 A | 10/1997 | Cooper | |
| 5,901,526 A | 5/1999 | Vidmar et al. | |
| 5,910,458 A | 6/1999 | Beer et al. | |
| 5,935,498 A * | 8/1999 | Vockel et al. | 264/136 |
| 5,941,018 A | 8/1999 | Herrema | |
| 6,095,503 A | 8/2000 | Burley et al. | |
| 6,106,401 A | 8/2000 | McAlpine | |
| 6,138,405 A | 10/2000 | Matz | |
| 6,158,919 A | 12/2000 | Landes | |
| 6,173,906 B1 | 1/2001 | Von Kerens | |
| 6,202,367 B1 | 3/2001 | Marino et al. | |
| 6,293,523 B1 | 9/2001 | Fendler | |
| 6,354,038 B1 | 3/2002 | Morris | |
| 6,416,200 B1 | 7/2002 | George | |
| 6,588,732 B1 | 7/2003 | Caceres et al. | |
| 6,880,955 B2 | 4/2005 | Lin | |
| 6,925,753 B1 | 8/2005 | Mallory | |
| 7,655,276 B2 | 2/2010 | Bliton et al. | |
| 2003/0075712 A1 | 4/2003 | Lin | |
| 2006/0150479 A1 | 7/2006 | Saunders et al. | |
| 2006/0277823 A1 | 12/2006 | Barnett et al. | |

FOREIGN PATENT DOCUMENTS

| | | |
|---|---|---|
| JP | 352019440 A | 2/1977 |
| WO | 9534703 | 12/1995 |

OTHER PUBLICATIONS

New and Views, Pultrusion of Composites—An Overview, by Atul Mittal & Soumitra Biswas, http://web.archive.org/web/20010309055412/http://www.tifac.org.in/news/pultr.htm9 Mar. 2001 [retrieved from internet Apr. 23, 2007] 13 pages.

* cited by examiner

FIBERGLASS LAWN EDGING

CROSS REFERENCE TO PRIOR APPLICATION

The present application is a continuation application of U.S. patent application Ser. No. 10/234,991 filed Sep. 4, 2002, which claims priority from provisional application No. 60/329,793 filed Oct. 16, 2001, which is hereby incorporated into the present application by reference.

BACKGROUND OF THE INVENTION

The present invention relates to material provided for lawn and garden edging. Lawn edging is typically used to provide a sharp line between two areas of diverse plant growth in a lawn. In the past a variety of edging systems have been developed.

U.S. Pat. No. 1,977,021 discloses a sheet metal edging. While sheet metal is flexible and inexpensive it tends to corrode quickly, particularly in this application where lawn and garden fertilizers are often being used.

U.S. Pat. No. 5,941,018 discloses a lawn edging system including stakes used to hold the edging in place. This patent discloses many of the common materials used for edging including molded or extruded plastic and aluminum extrudate. Each of these materials has problems. Most plastics hold up well in ground contact, but do not hold up well when exposed to UV light from the sun and to freezing conditions. Lawn edging must also be tough because lawn and garden equipment such as lawn mowers and bladed lawn edgers are often used right up next to the edging material. Most plastics are not tough enough to last more than a few seasons in this kind of abusive environment. While aluminum is tougher then plastic, it must be coated to look good and resist the corrosion of fertilizers. The coating system usually fails after just a few seasons.

It is therefore desirable to have a lawn edging system that is attractive, tough, corrosion and UV resistant, inexpensive to manufacture, and easy to install.

SUMMARY OF THE INVENTION

The invention consists of pultruded fiberglass edging. The resulting edging material is flexible yet tough and resistant to a variety of environmental factors.

Unlike steel and even aluminum, pultruded fiberglass is lightweight and easy to machine using just hand tools. Fiberglass also resists corrosion even in soil with fertilizer. Fiberglass is tougher then plastic and is also resistant to UV degradation. The present invention envisions a boarder installation method where the edging material and stakes are bundled together. These bundles would be the most efficient way to ship the raw materials to build the system. Once on the job site the bundles would be opened up and the system could be installed.

Once a length of edging has been pultruded it can be rolled up and packaged as a roll. During installation the material is flexible enough to be bent around obstacles. Connectors are available to join lengths of material and to make corners. Stakes can be of metal, plastic or of pultruded fiberglass material.

DESCRIPTION OF A PREFERRED EMBODIMENT OF THE INVENTION

Figure 1:
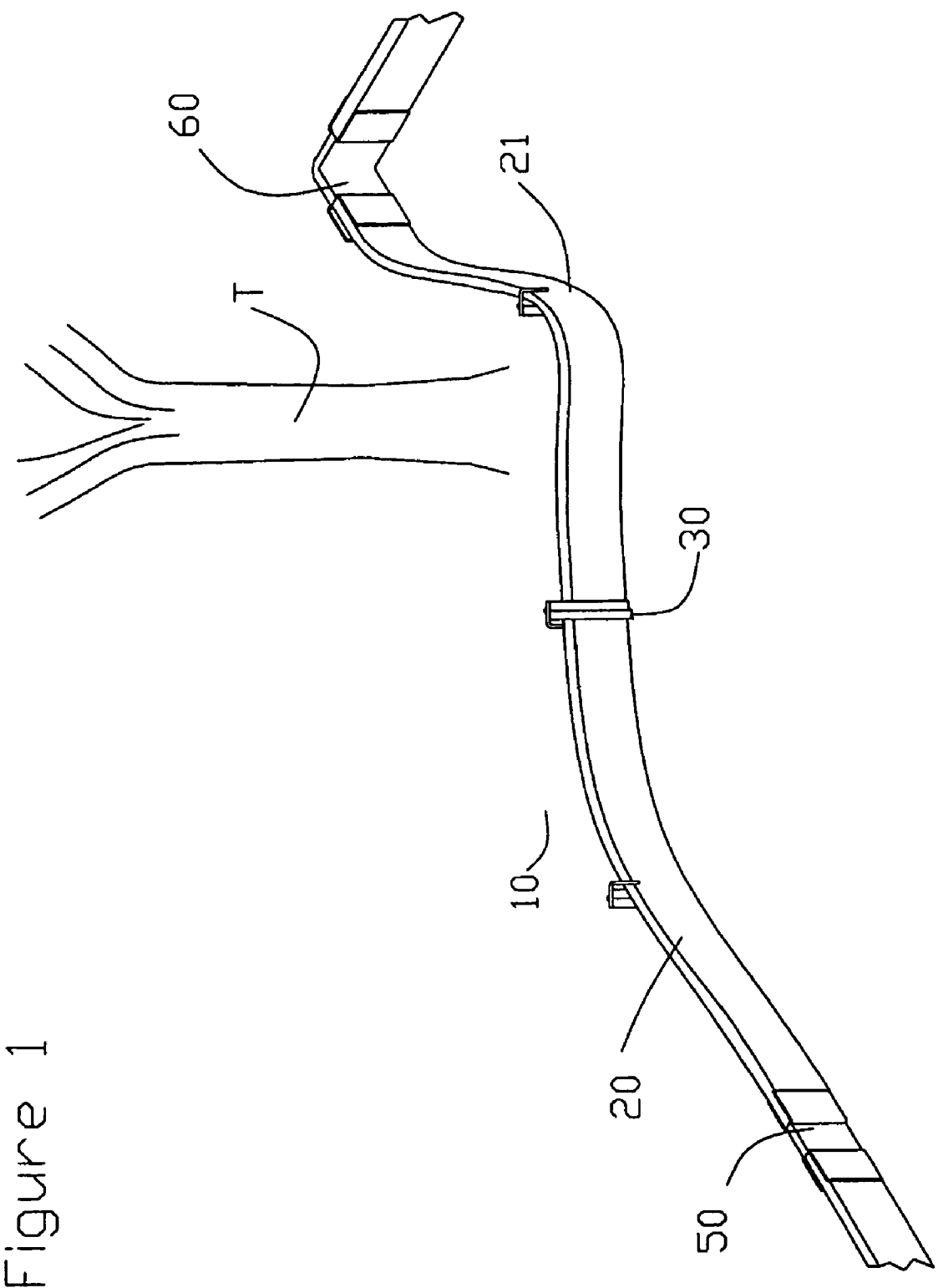
FIG. 1 is a view of the edging system installed

FIG. 1 shows the edging system installed in a typical application. The edging system (10) includes a length of flexible fiberglass edging (20). The lower portion of the edging (20) is not shown in this view as it is underground in the typical application. The edging (20) is flexible and is shown bending at (21) to go around an obstacle such as a tree (T). The system includes stakes (30), straight connectors (50), and corner connectors (60). The stakes (30) can be of any conventional type, a special matching fiberglass stake is shown. The system can be made in a variety of different colors and decorative patterns.

Figure 2:
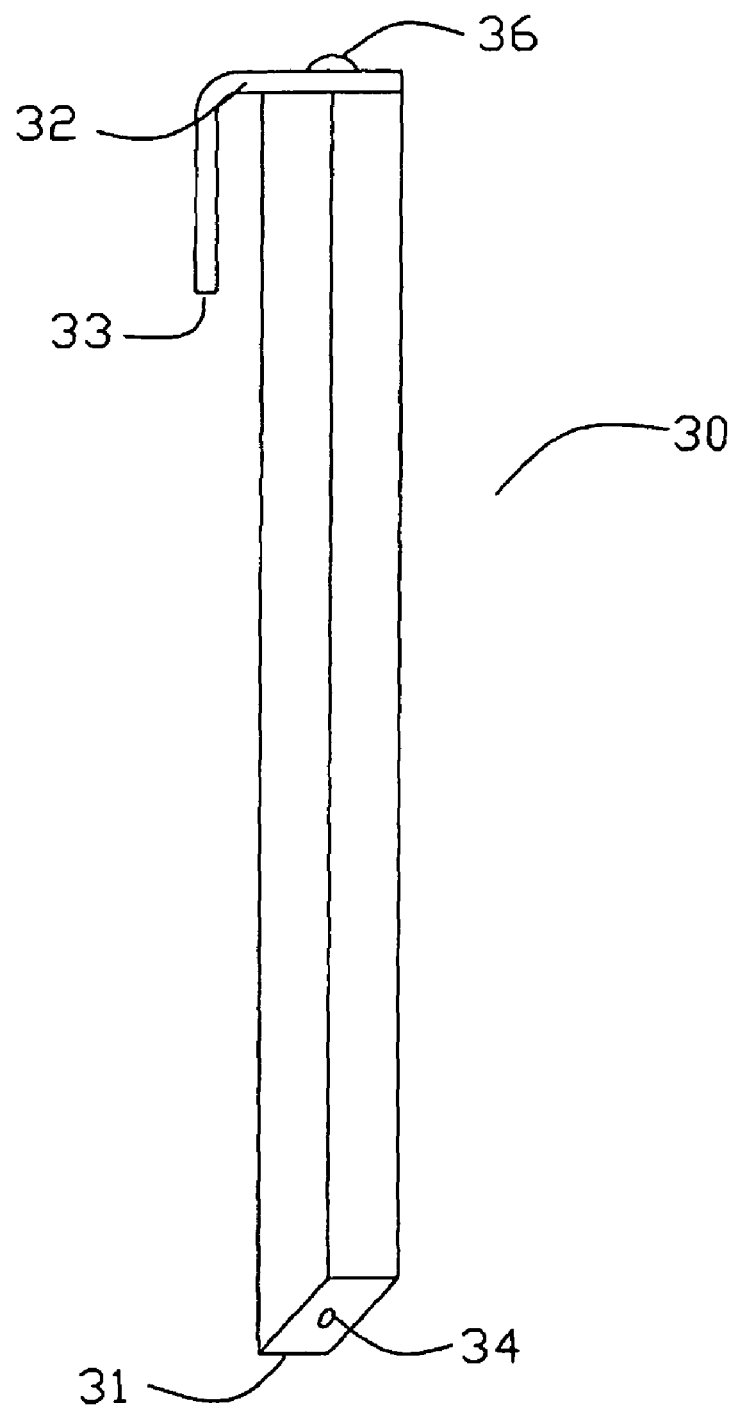
FIG. 2 is a view of a stake

FIG. 2 shows a matching pultruded fiberglass stake (30). The stake (30) has a sharpened end (31) and a hole (34) that passes through the length. A clip (32) with an extended arm (33) is held to the stake (30) by a screw or rivet (36) which uses the hole (34) as a pilot hole. For example, the stake (30) can be driven into position next to the edging (20) and then the clip (32) positioned over the edging (as shown in FIG. 1) and a screw (36) can be driven into the stake (30) to hold the clip in place. This fiberglass stake would have many of the same advantages stated above for fiberglass and would match the edging material (20) however any conventional stake material would also work.

Figure 3:
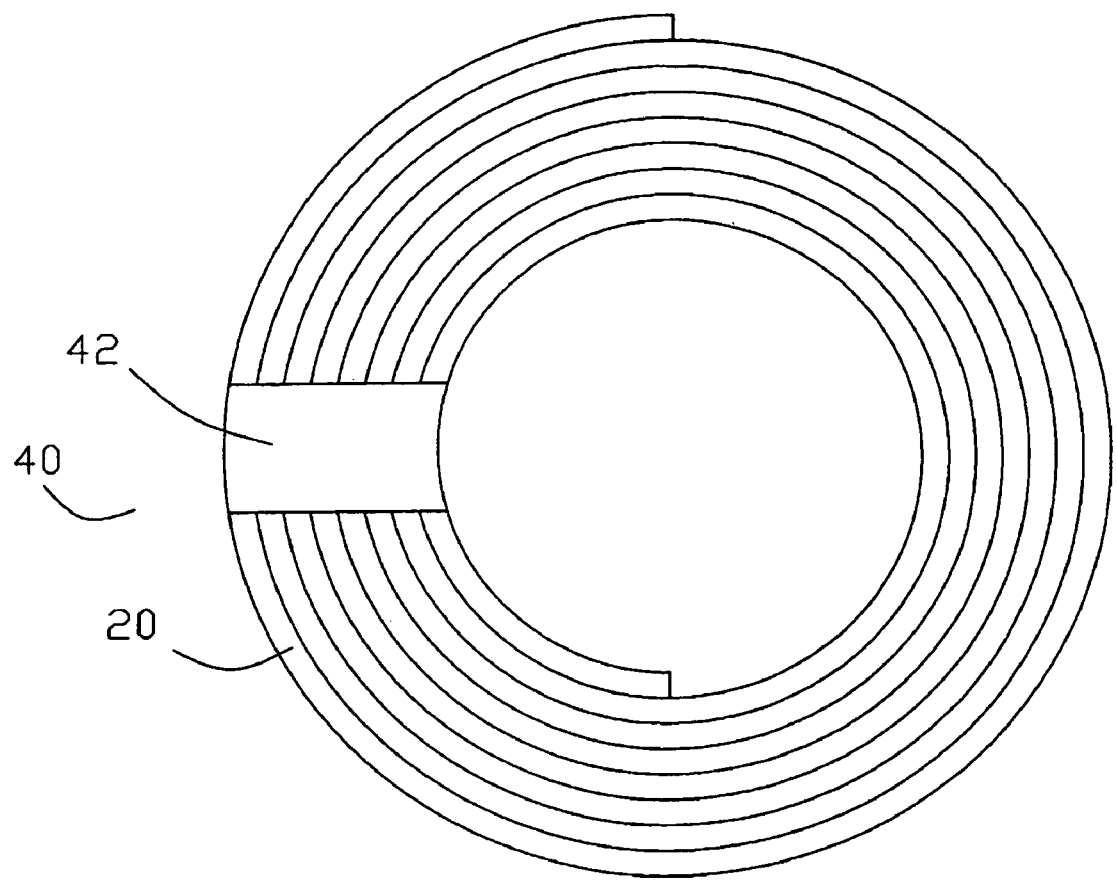
FIG. 3 is a view of a coil of edging material

FIG. 3 shows the edging (20) rolled up ready for shipping to the installation location. Rolling the long pultrusions make them easy to handle and ship. The roll (40) is held together with a piece of strapping tape (42). This roll (40) can be boxed or displayed in a store without a box. Typically the rolls might come in lengths of 25 feet to 100 feet.

Figure 4:
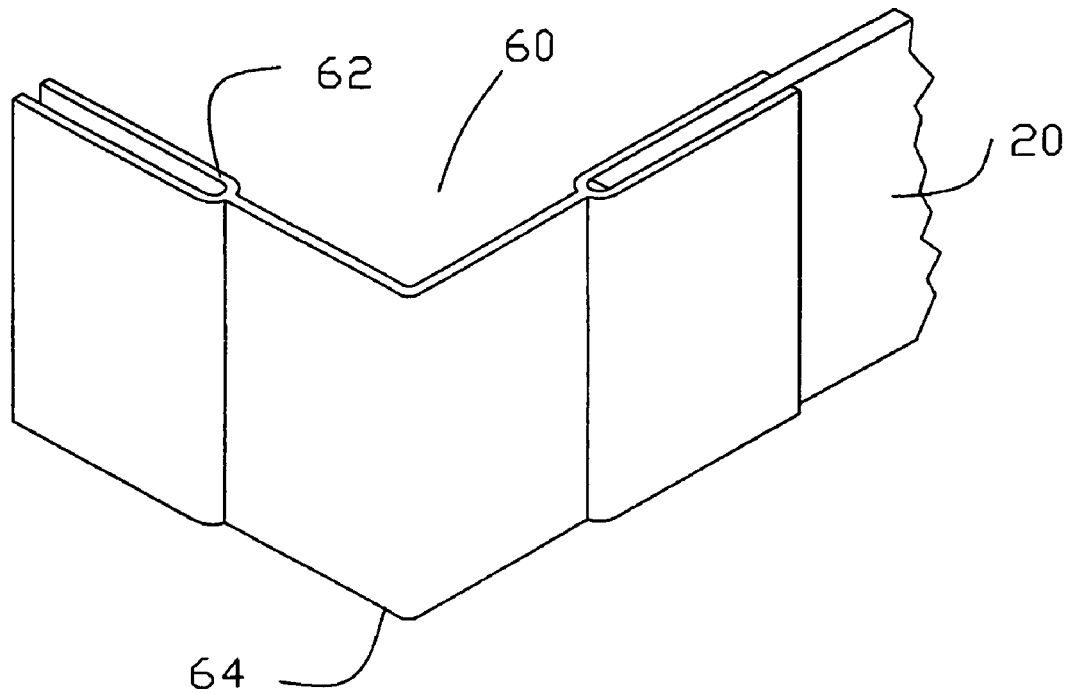
FIG. 4 shows a corner connector

FIG. 4 shows how a corner connector (60) works. The connector (60) includes two slots (62) for accepting an end of the edging (20). The connector (60) includes a bend (64) that is shown as 90 degrees. By placing two edging strips in each slot (62) a sharp 90 degree bend can be created. Other angles such as 45 degree would also be possible. This connector allows the system to create a sharp corner, where the pultruded fiberglass edging (20) typically cannot bend at a sharp angle. This corner connector (60) can be made of matching pultruded fiberglass or from an accent material.

Figure 5:
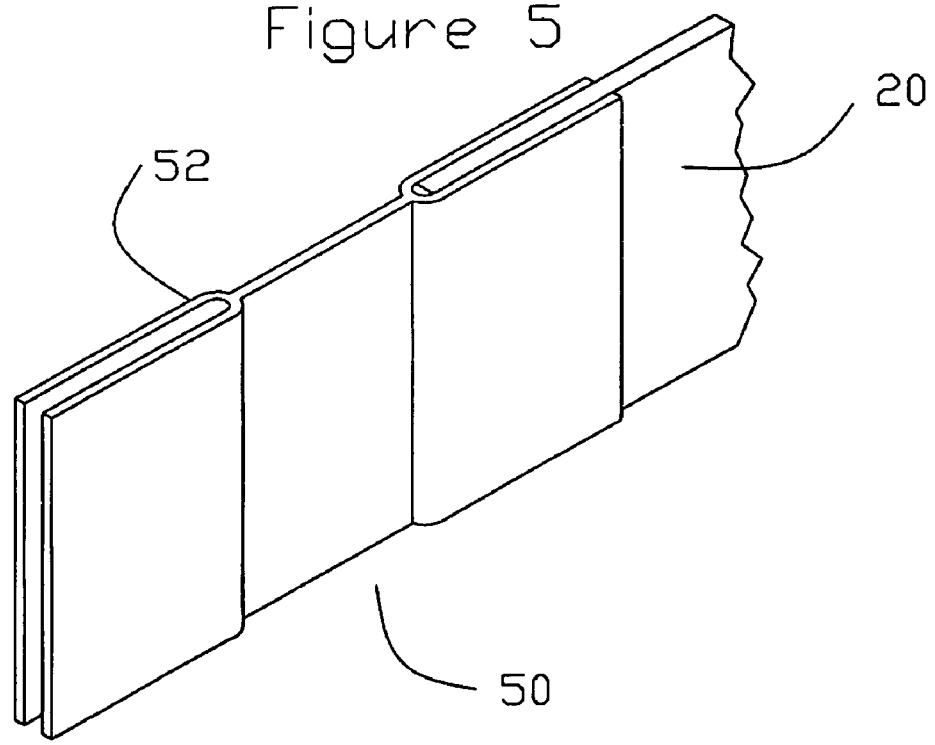
FIG. 5 shows a straight connector

FIG. 5 shows a straight connector (50). The connector (50) includes two slots (52) for accepting an end of the edging (20). This connector allows for splicing two pieces of edging (20) together to make a long run of edging.

Figure 6:
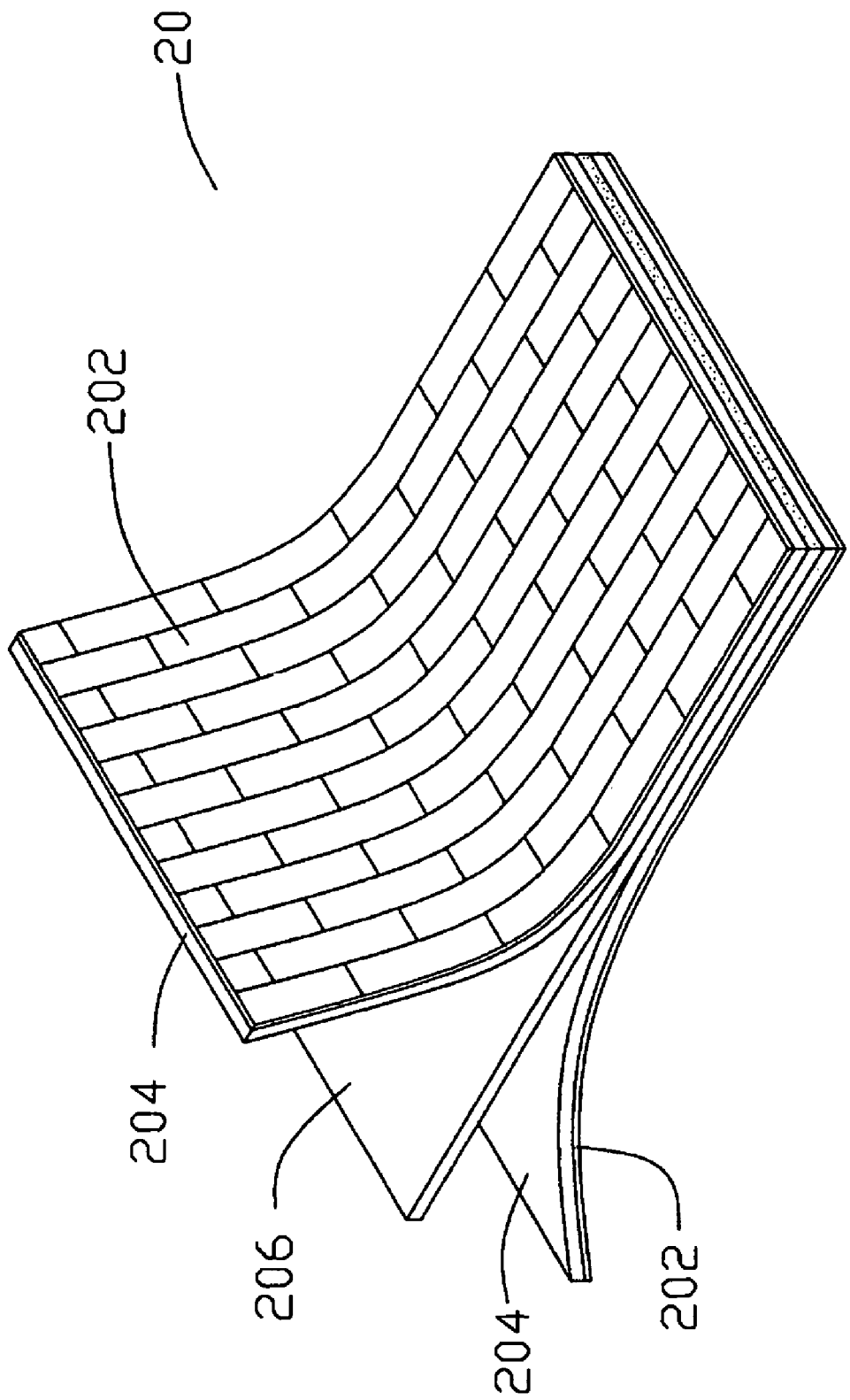
FIG. 6 shows the layers of the edging

FIG. 6 shows an exploded view of the layers of the edging (20). The exterior veil layer (202) on both sides is a polyester material that can be printed with patterns to give it the appearance of any desirable material such as brick (as shown), stone or wood. Layer (204) is the continuous strand mat. This layer consists of a thin mat of randomly oriented fiberglass strands. There are two layers (204) which sandwich the center (rovings) layer (206) which consists of a mat of long fibers oriented lengthwise with the length of the edging material (20).

Figure 7:
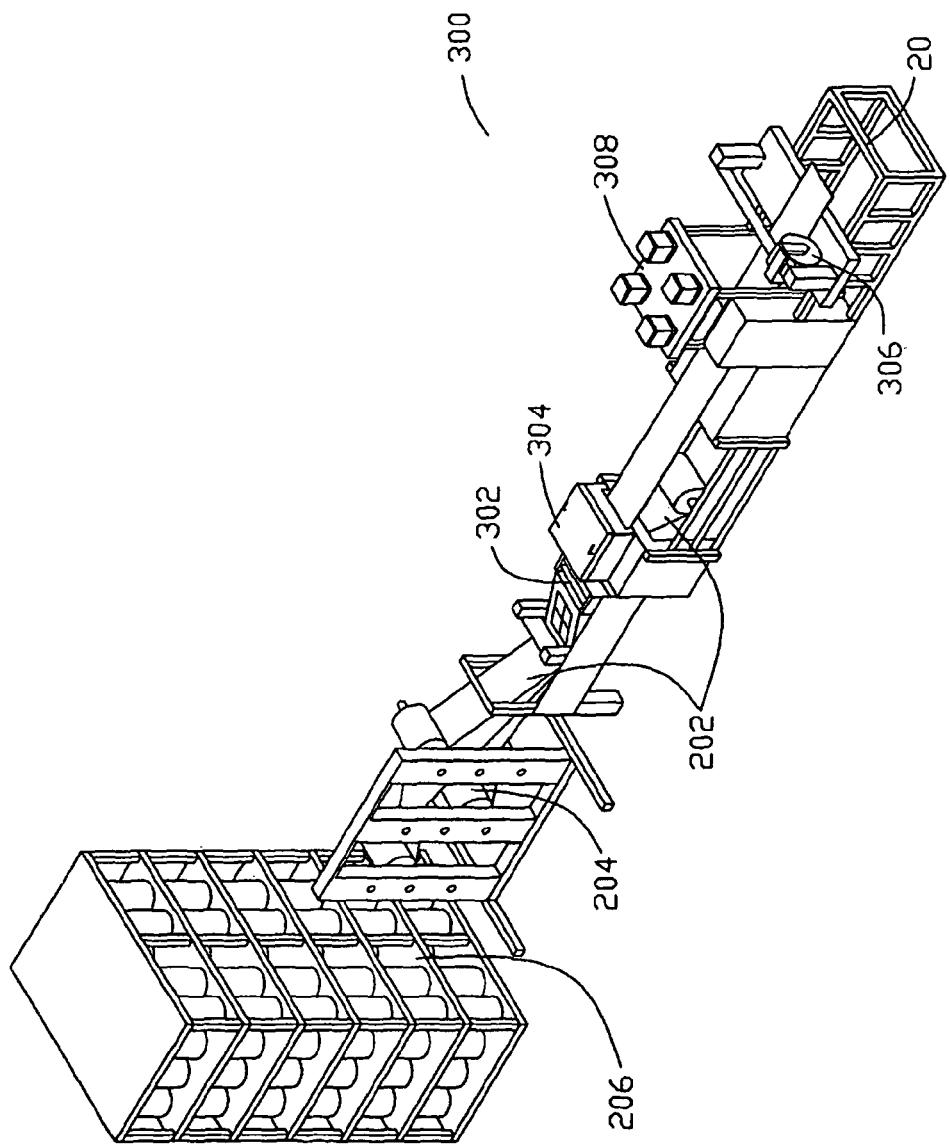
FIG. 7 shows the manufacturing process

Referring to FIG. 7, in the manufacturing process (300), the unidirectional rovings layer (206) is sandwiched between the two continuous strand mats (204) and this assembly is pulled through a vat of thermoset resin (302). The veil (202) is then applied to both sides and the assembly is pulled through a heated die (304). The lengths of edging (20) are cut by cut off saw (306) as the material comes out of the puller (308).

In use, a trench one to two inches deep is dug where the system is to be installed. Place one end of the edging roll (40) at the desired beginning of the edging trench (not shown) and secure by driving a stake (30) down beside the edging as shown in FIG. 1. The edging is then unrolled and staked at intervals of a few feet. For long runs involving multiple rolls (40) the straight connection section (50) can be used to provide an attractive splice or if desired the ends of two rolls can simply overlap to create an attractive, continuous boarder. At locations where a tight 90 degree bend is required, such as where two sidewalks come together, a corner connector (60) can be used. The edging (20) can be cut to length using tools used to cut conventional metal edging such as tin snips or a hack saw.

Having thus described the invention what is claimed as new and desired to be secured by Letters Patent is as follows:

1. A process of manufacturing a fiberglass lawn edging system including the steps of pultruding a first section of fiberglass lawn edging by pulling an inner layer of fiberglass strands and two mats of randomly oriented glass fibers through liquid thermoset resin to form a wet core, covering said wet core with a decorative covering layer to form a raw section of edging and then heating said raw section of edging in a continuous process to harden said wet core, cutting said first section to length and then forming a roll from said first section and binding said roll for shipment.

2. A process of manufacturing a lawn edging system comprising:
   pultruding a first section of lawn edging by pulling an inner layer of fiberglass strands and two mats of randomly oriented glass fibers through liquid thermoset resin to form a wet core;
   covering said wet core with a decorative covering layer to form a raw section of edging;
   heating said raw section of edging in a continuous process to harden said wet core;
   cutting said first section to length;
   forming a roll from said first section;
   binding said roll for shipment; and
   packaging said roll with ground stakes for holding said lawn edging to the ground.

3. The process of manufacturing a lawn edging system as in claim 2 wherein said step of cutting said first section to length comprises cutting said first section of lawn edging to a length of between twenty five and one hundred feet.

4. The process of manufacturing a lawn edging system as in claim 2 wherein said ground stakes are made of pultruded fiberglass.

5. The process of manufacturing a lawn edging system of claim 2, wherein the decorative covering layer is printed with a decorative pattern that resembles one or more of brick, stone, and wood.

6. The process of manufacturing a lawn edging system of claim 2, wherein the decorative covering layer comprises a polyester material.

7. A process of manufacturing a lawn edging system comprising:
   pultruding a first section of lawn edging by pulling an inner layer of fiberglass strands and two mats of randomly oriented glass fibers through liquid thermoset resin to form a wet core;
   covering said wet core with a decorative covering layer that is printed with a decorative pattern to form a raw section of edging;
   heating said raw section of edging in a continuous process to harden said wet core, the decorative pattern being visible on the first section after heating;
   cutting said first section to length;
   forming a roll from said first section;
   binding said roll for shipment; and
   packaging said roll with ground stakes for holding said lawn edging to the ground.

8. The process of manufacturing a lawn edging system as in claim 7 wherein said step of cutting said first section to length comprises cutting said first section of lawn edging to a length of between twenty-five and one hundred feet.

9. The process of manufacturing a lawn edging system as in claim 7 wherein said ground stakes are made of pultruded fiberglass.

10. The process of manufacturing a lawn edging system of claim 7, wherein the printed pattern resembles one or more of brick, stone, and wood.

11. The process of manufacturing a lawn edging system of claim 7, wherein the decorative covering layer comprises a polyester material.

* * * * *